United States Patent
Ferlitsch (10) Patent No.: US 8,319,993 B2
(45) Date of Patent: Nov. 27, 2012

(54) METHODS FOR OPERATING USER INTERFACES OF A DEVICE CONTROLLABLE AT A PLURALITY OF ACCESS POINTS

(75) Inventor: Andrew R. Ferlitsch, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1034 days.

(21) Appl. No.: 12/011,133

(22) Filed: Jan. 24, 2008

(65) Prior Publication Data
US 2009/0190157 A1 Jul. 30, 2009

(51) Int. Cl.
*G06F 15/177* (2006.01)
(52) U.S. Cl. .................. 358/1.15; 358/1.1; 358/1.13
(58) Field of Classification Search ............ 358/1.13, 358/1.15, 1.1, 1.6; 719/310
See application file for complete search history.

(56) References Cited

U.S. PATENT DOCUMENTS

| | | | |
|---|---|---|---|
| 4,982,344 A * | 1/1991 | Jordan | 715/804 |
| 5,333,286 A | 7/1994 | Weinberger et al. | |
| 5,699,494 A | 12/1997 | Colbert et al. | |
| 5,937,150 A | 8/1999 | Phan | |
| 7,343,627 B2 * | 3/2008 | Gaebel et al. | 726/27 |
| 7,895,594 B2 * | 2/2011 | Kirilline et al. | 718/1 |
| 2002/0122203 A1 | 9/2002 | Matsuda | |
| 2003/0053105 A1 * | 3/2003 | Morooka et al. | 358/1.13 |
| 2004/0061729 A1 | 4/2004 | Green et al. | |
| 2004/0260790 A1 | 12/2004 | Balloni et al. | |
| 2005/0022210 A1 * | 1/2005 | Zintel et al. | 719/318 |
| 2005/0162675 A1 | 7/2005 | Ferlitsch | |
| 2005/0259277 A1 | 11/2005 | Ferlitsch | |
| 2005/0283735 A1 | 12/2005 | Ferlitsch et al. | |
| 2006/0026600 A1 * | 2/2006 | Yoshida | 719/310 |
| 2006/0039012 A1 | 2/2006 | Ferlitsch | |
| 2006/0098221 A1 | 5/2006 | Ferlitsch | |
| 2006/0129746 A1 | 6/2006 | Porter | |
| 2006/0158674 A1 | 7/2006 | Mizoguchi | |
| 2007/0028182 A1 | 2/2007 | Kong | |
| 2007/0288857 A1 | 12/2007 | Boyer et al. | |
| 2008/0244216 A1 * | 10/2008 | Zilavy | 711/173 |

FOREIGN PATENT DOCUMENTS

| | | |
|---|---|---|
| EP | 1 293 884 A2 | 3/2003 |
| JP | 07-073011 | 3/1995 |
| JP | 07-0730311 | 3/1995 |
| JP | 08234945 A | 9/1996 |
| JP | 2002-073320 | 3/2002 |
| JP | 2007-042065 | 2/2007 |

\* cited by examiner

*Primary Examiner* — King Poon
*Assistant Examiner* — Allen H Nguyen
(74) *Attorney, Agent, or Firm* — Larry K. Roberts (57) ABSTRACT

Methods for operating the user interfaces (UIs) of a device such as an MFP device while the device is under simultaneous user operations from different access points.

17 Claims, 6 Drawing Sheets

METHODS FOR OPERATING USER INTERFACES OF A DEVICE CONTROLLABLE AT A PLURALITY OF ACCESS POINTS

BACKGROUND

Devices such as multifunction peripheral (MFP) devices are capable of multiple functions such as copying, scanning and printing. These device may receive jobs such as electronic print jobs or files from a connected host device such a PC, or over a network such as a local area network (LAN) or wide area network (WAN), and from user activation of a local front panel. If multiple users attempt to simultaneously operate an MFP from different locations, difficulties can arise.

DETAILED DESCRIPTION

In the following detailed description and in the several figures of the drawing, like elements are identified with like reference numerals. The figures are not to scale, and relative feature sizes may be exaggerated for illustrative purposes.

Overview of an Exemplary Embodiment

An exemplary embodiment may provide a method for operating the user interfaces (UIs) of a device such as an MFP device while the device is under simultaneous user operations from different interfaces and access points.

Figure 1:
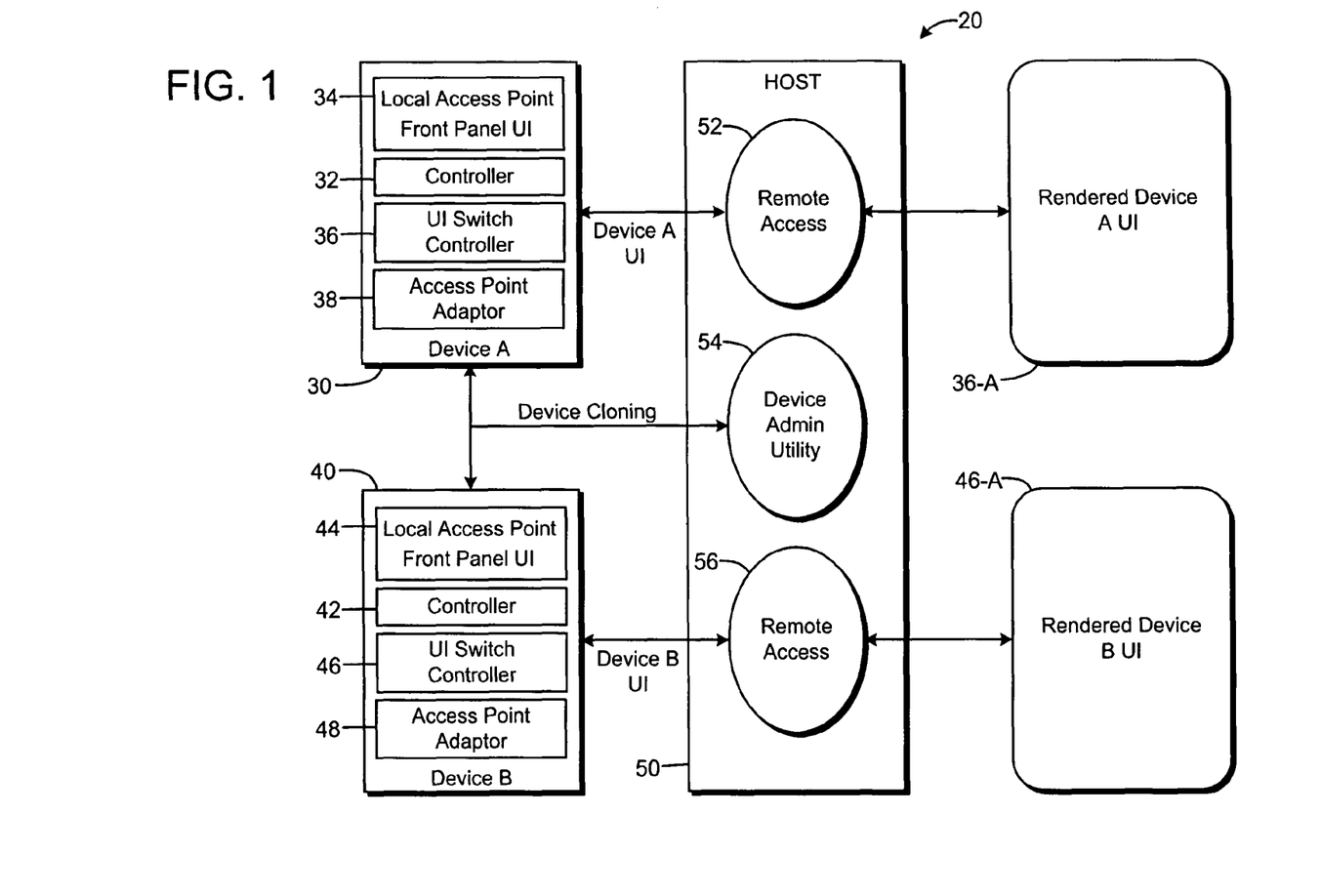
FIG. 1 schematically depicts an exemplary operating environment for an exemplary embodiment of a control method.

An exemplary operating environment is illustrated in FIG. 1, and includes one or more MFP devices. Each MFP has the capability to project a copy of its UI to a remote access point. In an exemplary application, HTML 4.01 (HTML 4.01 Specification, W3C Recommendation, 24 Dec. 1999) may be employed in projecting a remote interface.

In this exemplary environment, each MFP may operate in multiple simultaneous job contexts, such as one for printing and another for device administration. This multi-job simultaneous handling is done through a job context switch (e.g., time sharing). The job context switch may also be responsible for handling resource conflicts between job contexts (e.g., use of the scanner).

Each job context has associated with it an instance of the device's UI. Each UI instance is a derivative of one of the device's native UI states. That is, the device creates a common virtual UI per interface access, independent of the access point. An access point adaptor converts the virtual UI into a physical UI instance.

Some job contexts may have shared UIs. For example, if two users are both viewing the device's job queue, the virtual UI for each user would be the same device UI state. In other cases, the job contexts may have different UIs. For example, if two users are entering job parameters, the virtual UI for each user may be a different instance derived from the same initial device UI state.

If a change in one virtual UI state would effect a change in one or more separate virtual UI states, the corresponding virtual UI states are updated accordingly. For example, if an administrative assistant places a device into an offline state from an administrative menu, each virtual UI associated with a job menu may be updated with an offline indicator.

Exemplary Operating Environment

An exemplary operating environment 20 is schematically illustrated in FIG. 1, and includes one or more MFPs 30 and 40, devices A and B. The MFPs may perform one or more imaging related functions, such as printing, copying, faxing, scanning, document filing, publishing to the web, format conversion, and audio/visual (A/V) recording/displaying.

MFP 30 has a controller 32, a local access point 34 which may be a front panel and corresponding local or native UI, a UI switch controller 36 and an access point adaptor 38. The MFP 30 is communicatively connected to at least one remote access point 52, in this example provided by host 50. MFP 40 similarly has a controller 42, a local access point 44 such as a front panel and corresponding local or native UI, a UI switch controller 48, and an access point adaptor 48. The MFP 40 is communicatively connected to at least one remote access point 56, in this example provided by host 50. In an exemplary embodiment, the device controller 32 and 42 may be implemented by a microcomputer or an ASIC, and may include a digital memory. The UI switch controller 36 and 46 may be implemented as a firmware module in the MFP.

The host 50 may be connected to the MFPs by a local area network, a wide area network, by internet connections, or by other connection technologies. For example, the MFP devices, the host 50 and remote access points may be communicatively coupled, such as by TCP/IP, Apple Talk, IEEE 1284 Parallel Port, IrDA, Bluetooth, WiFi, other wireless protocols, and local ports (e.g., serial, USB). The host 50 may be a personal computer or a server, for example, and includes a device administrator utility program 54, which may be configured to control each MFP 30 and 40.

Via the remote access point, each MFP device can project a replica of the MFP's front panel UI, such as through a web browser. Thus, the device A UI is projected through the remote access point 52 to provide a remote replica of the UI as rendered device A UI 36-A. The device B UI is projected through the remote access point 56 to provide a remote replica of the UI as rendered device B UI 46-A. Each MFP may be operated in the same manner from the remote UI 36-A and 46-A, respectively, as with the local UI 36 and 46, respectively. Changes made on the remote UI are reflected back on the local UI and vice-versa.

Virtual UIs

Figure 2:
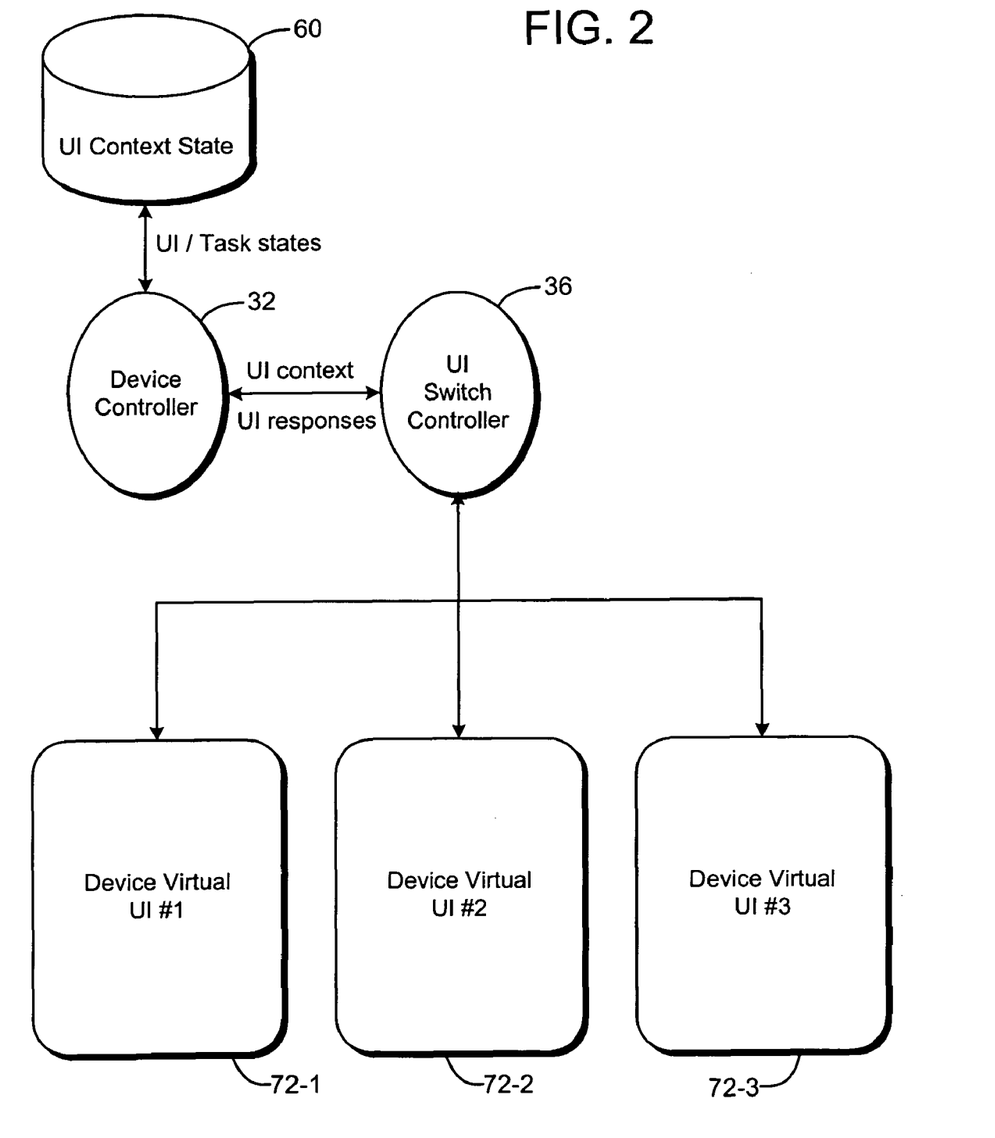
FIG. 2 is a schematic diagram illustrating an exemplary embodiment of virtual user interfaces for an MFP device.

FIG. 2 is a simplified schematic illustration of an exemplary embodiment showing an MFP's user interface rendered as a plurality of virtual UIs. In an exemplary embodiment, the MFP UI is defined in a display independent manner. For example, it may be defined in HTML, XHTMUCSS, WML or Proprietary XML schema.

All the MFP's UI states are represented (either statically or dynamically) in a device independent manner. One UI state represents the root UI state, from which all other UI states are derived from. A root UI state may be anything, such as a welcome screen with an enter button, a top level job choice menu, or a user login. In an exemplary embodiment, the root UI state is the first UI presented to the user when the device is first activated.

The MFP may perform multiple simultaneous jobs which are independently initiated. Each simultaneous job has an associated sequence of UI states 60 (FIG. 2), which may be a predetermined or dynamically determined sequence. Each simultaneous job has a job context. The job context stores information to suspend and resume the job state. One of the items stored is the current UI state associated with the job, i.e. the UI context state 60 (FIG. 2). The current UI state is stored in a device independent manner (e.g., XHTMUCSS) in the device controller 32.

For example, the MFP may be performing two print jobs 1 and 2 and a scan job 3. The MFP controller time slices operations between the jobs as to avoid resource conflicts and achieve optimal output performance. For example, the MFP may do the following time slices:

| Time Slice | Job | Activity |
| --- | --- | --- |
| 0 | 1 | Set Print Settings |
| 1 | 2 | Set Print Settings |
| 2 | 3 | Set Scan Settings |
| 3 | 1 | Ripping (raster image processing) |
| 4 | 3 | Scanning |
| 5 | 2 | Outputting |
| 6 | 1 | Ripping |
| 7 | 2 | Outputting |
| 8 | 3 | Sending |

One or more of the above operations, when not in resource conflict, may also be performed in parallel.

When a job context switch is made, the current job context 60 is loaded into the device controller 32 of exemplary device 30 (FIG. 1), which starts performing the next task(s) in the job. Additionally, the current UI state is loaded into the virtual UI associated with the job and sent to the UI switch controller 38 of the exemplary MFP 30. As the device controller 32 performs actions, the current UI state is updated and loaded into the virtual UI associated with the job, in this case virtual UIs 72-1, 72-2 and 72-3 (FIG. 2).

Figure 3:
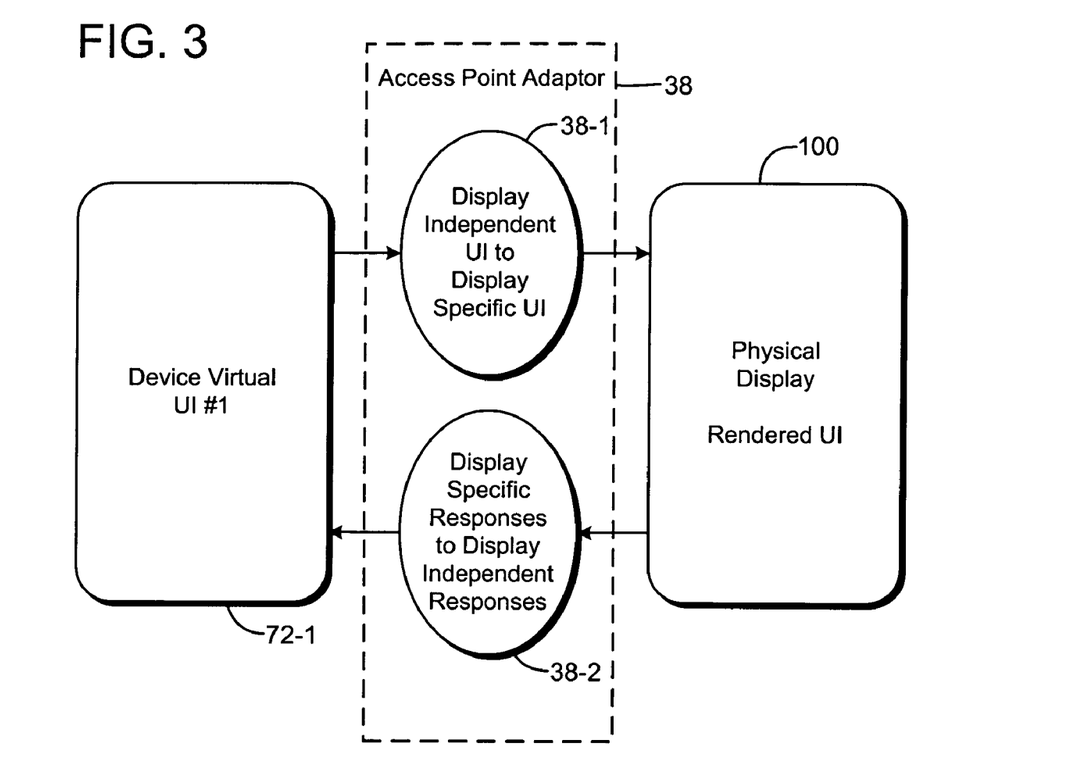
FIG. 3 is a simplified diagrammatic view illustrating an exemplary technique for associating a virtual UI with a physical display as illustrated in FIG. 3.

A virtual UI may be associated with a physical display as illustrated in FIG. 3, in which exemplary device virtual UI 72-1 is associated with a physical display device 100. In an exemplary embodiment, an access point adaptor 38 converts the virtual UI to a display specific UI which is provided to physical display 100 by an operation indicated as 38-1. Thus, as the current UI state is updated, the access point adaptor 38 updates the corresponding changes in the physically rendered UI. In this embodiment, the access point adaptor is a process that maps between the abstract representation of a virtual UI to a physical representation, and vice versa. Such processes are known in the art; one example is XUL, a user interface language (http://www.mozilla.org/projects/xul/) for generically describing a UI, and transmitting it to another device, which then renders it specific to its interface.

Inputs may also be received through the physically rendered UI 102, which are then mapped back to the access point adaptor 38, converted to the display independent format by the operation 38-2 (FIG. 3) and passed back to the device controller such as controller 32 (FIG. 1). The device controller in response may effect a change in the execution of the job and/or update the current UI state.

When the job context is switched out, the UI state at the time of the switch out is saved back in the job context as the current UI state. Switching out a job context in this exemplary embodiment relates to parallel job processing, i.e., if the MFP device is doing two jobs at the same time, the device may do chunks of one, then the other and so forth. Switching out a job may also apply to suspending and resuming a job.

UI Attachment—Access Point Adaptor

Figure 4:
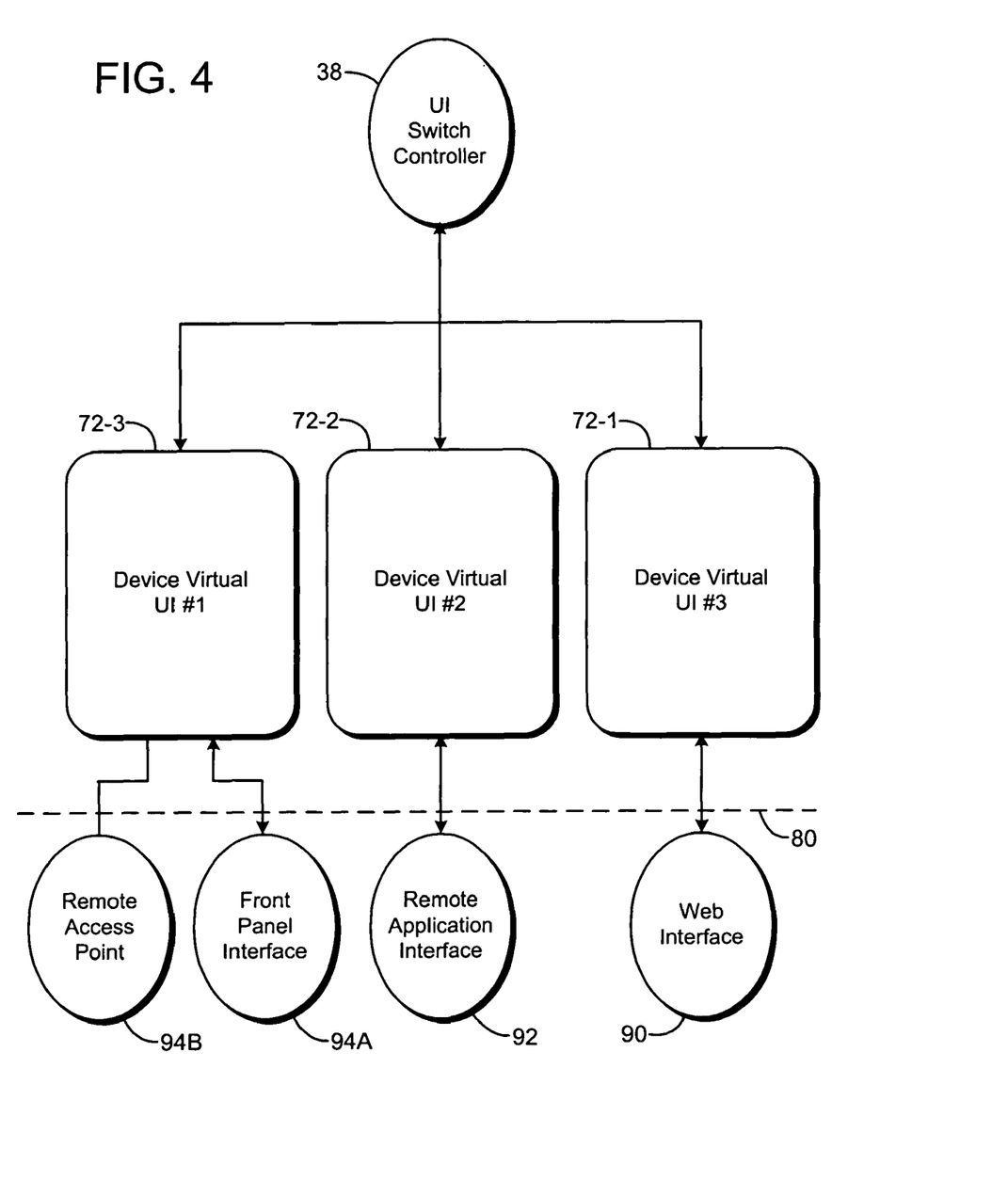
FIG. 4 is a schematic diagram illustrating an exemplary technique for associating a virtual UI with one or more physical display devices.

In an exemplary embodiment illustrated in FIGS. 3 and 4, each virtual UI may be associated with one or more physical display devices. For example, the MFP device may have three virtual UIs 72-1, 72-2 and 72-3 corresponding to the earlier described three simultaneous jobs. The first job context (print job #1) may be associated with a remote access point 90, such as a web browser on a host PC. In this context, the user operates the web browser to attach to the virtual UI 72-1. This may be done by entering a unique URL associated with the job context (e.g., mydevice/job1). The current UI state associated with the virtual UI is then converted by the access point adaptor 38 into a format that can be rendered by the web browser.

Simultaneously, the second job context (e.g., print job #2) may be associated with another remote access point, such as a remote application interface (RAI) 92 (FIG. 4). In this case, an application remote from the MFP (e.g., a Sharp OSA (Open System Architecture) application, a printer driver, etc.) is operating the MFP device, e.g. device 30, and projects a user interface for operational control by the user. The user interface of the remote application may be imported and its responses exported to/from the MFP. In this case, the access point adaptor may be embedded in the remote application, or otherwise be upstream from the remote application, i.e. between the remote application and the MFP device. In an exemplary embodiment, the access point adaptor may be implemented as a firmware module or software module within the MFP. In other exemplary embodiments, the access point adaptor may be implemented in a host device such as host computer 50.

Simultaneously, the third job context may be associated with both a local and remote access point 94A, 94B. In this case, the virtual UI 72-3 is mapped via the access point adaptor 38 to both the physical displays associated with the local and remote access points. Both manifested UIs would be replicas of the other, within display capabilities. Inputs entered through one manifested UI would affect the same change as if entered via the other manifested UI. Any change in UI state is then propagated to each manifested UI.

For example, the user may initiate a scan-to-application job from a host PC. The application may have a remote application interface, such as remote access 52 or 56 (FIG. 1), which allows the application to display a sequence of UI states from the MFP associated with the scan job. For example, the user might set scan settings at the application and the target send location. The user may then physically walk up to the MFP and enable the job context associated with their scan job through the front panel, such as by selecting from a job list or entering a PIN, job id or password. The current UI state of the virtual UI stored in the job context is then loaded and converted for rendering on the local user interface (e.g., LCD touch panel).

UI Context Switching—Individual UI contexts

In an exemplary embodiment, two or more virtual UIs may be connected as a single logical UI, such as the shared UI context state 60 (FIG. 2). A single logical UI is associated with a job context which may have one or more virtual UI interfaces (e.g., local and remote).

In one mode, a logical UI has a single virtual UI. For example, two users may be using the MFP simultaneously, such as printing a print job. Each user has a job context and an associated virtual UI (V-UI) connected to a display means, i.e. a physically rendered view, e.g. a browser window, direct print application window on a host PC, etc.

Figure 5:
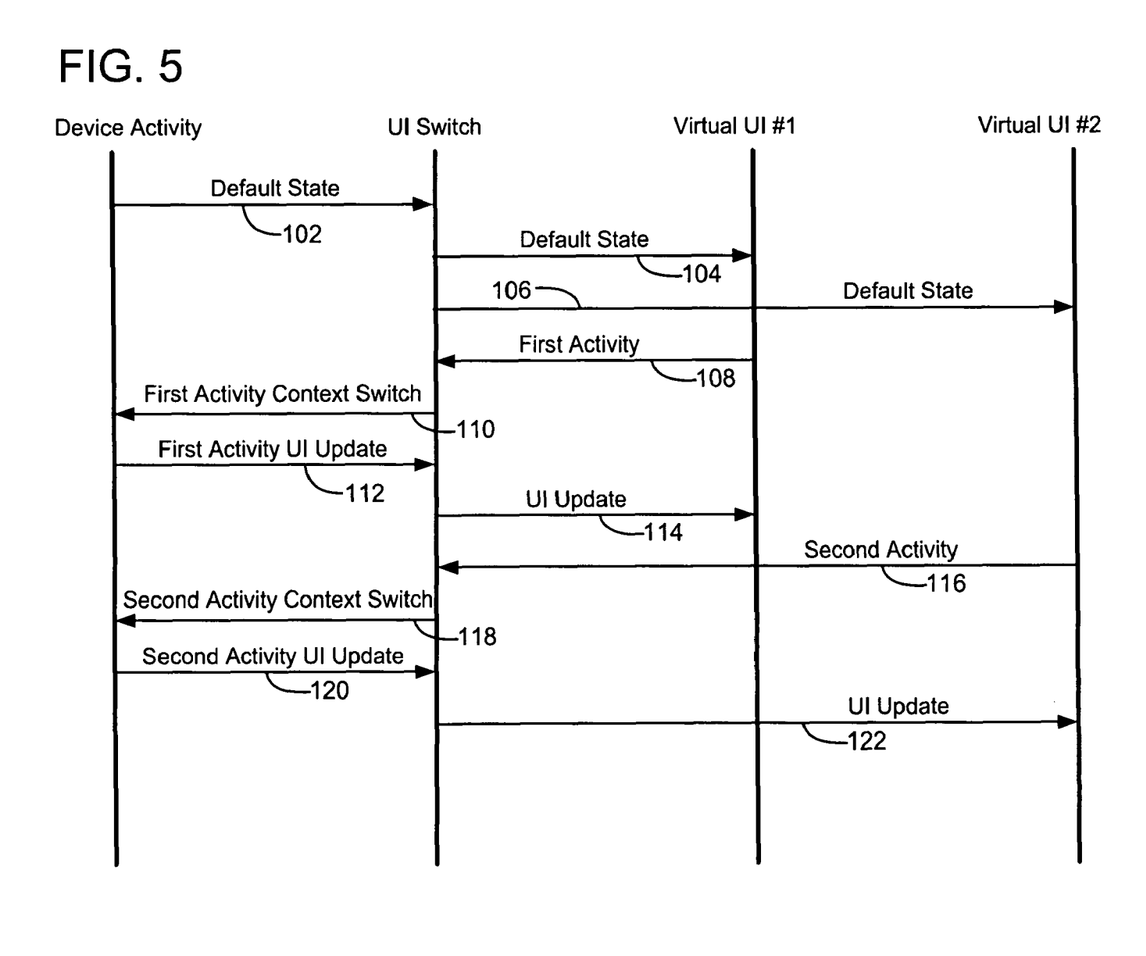
FIG. 5 diagrammatically illustrates an exemplary embodiment depicting possible state progressions through which two job contexts may proceed.

FIG. 5 diagrammatically illustrates possible state progressions through which the two job contexts may go in an exemplary embodiment. First, both V-UIs are initialized to the default UI state of the MFP device, indicated as default state 102 passed through a UI switch as default states 104, 106 to initialize V-UIs #1 and #2 to the default state. The first user generates a first activity 108 (e.g., a print job submission). A UI switch passes the first UI activity to the first job context as 110. The job context may then update the current UI state (as UI update 112). The UI switch then updates 114 the V-UI for the first activity according to the current UI state.

In series, or in parallel, the second user at V-UI #2 generates a second activity 116 (e.g., a print job submission). The UI switch passes the second UI activity to the second job context 118. The job context may then update the current UI state 120. The UI switch then updates the V-UI for the second activity according to the current UI state.

UI Context Switching—Combined (Cloned) UI contexts

In one mode, a logical UI has multiple virtual UIs. For example, a remote operator technician may assist a walkup user to an MFP device. Both the walkup user and the remote operator have the same job context, but with different associated V-UIs. The walkup user has a V-UI #1 connected to the front panel, while the remote operator has a V-UI #2 connected to a display means (e.g., web browser) on a host PC. The remote operator's UI can be considered a clone of the walkup user's UI.

Figure 6:
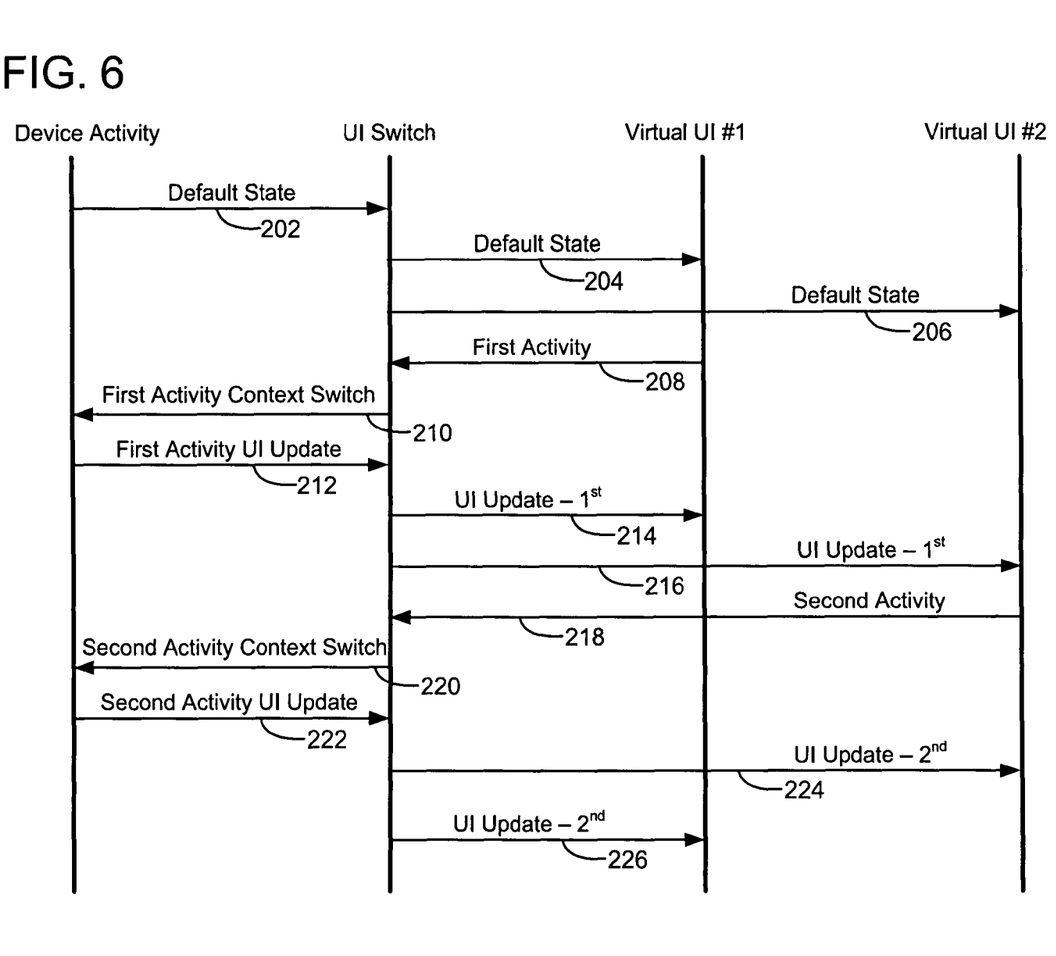
FIG. 6 shows exemplary state progressions through which two virtual UIs for a single job context may go through, for an exemplary embodiment.

FIG. 6 shows possible state progressions the two V-UIs for a single job context may go through, for an exemplary embodiment. First, both V-UIs (V-UI #1 and V-UI #2) are initialized (204, 206) to the default UI state 202 of the MFP device. The walkup user generates a first activity 208 (e.g., scan-to-desktop). A UI switch passes the first UI activity to the single job context as 210. The job context may then update the current UI state as 212, as a result of performing actions associated with the first UI activity. The UI switch then updates the V-UIs for both the walkup user and remote operator for the current UI state (214, 216).

The remote operator may then generate a second activity 216 (e.g., correcting the user's input). A UI switch passes the second UI activity to the single job context as 218. The job context may then update the current UI state 220 as a result of performing actions associated with the second UI activity. The UI switch then updates the V-UIs for both the walkup user and remote operator for the current UI state (222 and 224).

While an exemplary embodiment may be practiced on an imaging related device, other applications include other multi-user peripheral devices, such as a set-top box, a computer, a communication switch, and a gaming device.

Although the foregoing has been a description and illustration of specific embodiments of the subject matter, various modifications and changes thereto can be made by persons skilled in the art without departing from the scope and spirit of the subject matter as defined by the following claims.

What is claimed is:

1. A method for operating user interfaces of a multifunction peripheral (MFP) device configured for performing print jobs, scan jobs and copy jobs, the device having a device controller and a native user interface (UI) and controllable at a plurality of access points, the method comprising:
    operating the device in multiple simultaneous job contexts, said job contexts including at least one of a print job context, a scan job context and a copy job context;
    associating an instance of the native UI with each of said job contexts, each of said simultaneous job contexts having an associated sequence of UI states;
    creating a virtual UI corresponding to one of said instances of the UI, the virtual UI maintained in a device-independent format;
    converting the virtual UI into a physical UI instance for one of the access points and projecting the virtual UI to said one of the access points; and
    wherein said operating the device in multiple simultaneous different job contexts includes:
    job context switching between job contexts using time-sharing, the device controller time slicing operations between job contexts to avoid resource conflicts;
    storing information for each job context by the device controller, including information to suspend and resume the job context, including a current UI state as a UI context state associated with the job.

2. The method of claim 1, wherein said virtual UI is associated with one or more physical display devices at said access point.

3. The method of claim 2, wherein said plurality of access points includes a front panel interface, and a remote access point.

4. The method of claim 3, wherein said remote access point includes a remote application interface or a web interface. Zone Name: OCRZone 5. The method of claim 1, wherein said one of said access points is a web browser on a host PC, and wherein said converting the virtual UI into a physical instance for said one of the access points comprises:
    converting a current UI state associated with the virtual UI into a format that can be rendered by the web browser.

6. The method of claim 1, wherein each instance of the UI is a derivative of a state of the native UI, a plurality of virtual UIs are associated with one of said job contexts corresponding to a respective plurality of access points, and said plurality of virtual UIs represent the same UI state.

7. The method of claim 1, wherein each instance of the UI is a derivative of a state of the native UI, a plurality of virtual UIs are associated with said job context corresponding to a respective plurality of access points, and said plurality of virtual UIs represent different UI states.

8. The method of claim 1 wherein said device-independent format is one of HTML, XHTML/CSS, WML or an XML schema.

9. The method of claim 1, further comprising:
    loading a current job context into the device controller when a job context switch is made, and commencing the next task(s) in the job;
    loading the current UI state into the virtual UI associated with the job and sending the current UI state to a UI switch controller of the device;
    as the device controller performs actions, updating the current UI state and loading the current UI state into the virtual UI associated with the job.

10. A method for operating user interfaces of a multifunction peripheral (MFP) device configured for performing print jobs, scan jobs and copy jobs, the MFP device having a device controller and a user interface (UI) and controllable at a plurality of access points, the method comprising:

operating the device to perform multiple simultaneous different jobs, each job having a job context, said job contexts including at least one of a print job context, a scan job context and a copy job context;

associating with each job context an associated sequence of UI states and data to suspend and resume a job state;

storing a current UI state for each job context in a device independent manner in a digital memory;

associating an instance of the UI with each of said job contexts;

creating a virtual UI corresponding to said instance of the UI for each of the job contexts, the virtual UI maintained in a device-independent format;

conducting a job context switch to a current job context, including loading the current job context into a device controller, and performing one or more tasks associated with the job context;

updating a current state of the UI and loading the current state of the UI into the virtual UI associated with the current job context;

converting the virtual UI associated with the current job context into a physical UI instance and projecting the virtual UI to one of said plurality of access points; and     wherein said operating the device to perform multiple simultaneous different job contexts includes:

job context switching between job contexts using time-sharing, the device controller time slicing operations between job contexts to avoid resource conflicts;

storing information for each job context by the device controller, including information to suspend and resume the job context, including a current UI state as a UI context state associated with the job.

11. The method of claim 10, wherein said plurality of access points includes a device front panel interface, and a remote access point.

12. The method of claim 11, wherein said remote access point includes a remote application interface or a web interface.

13. The method of claim 10, further comprising:

receiving a user input through said rendered physical UI at said one of said plurality of access points;

converting said received user input into said device-independent format and passing the converted user input to the device controller;

in response to the converted user input, effecting a change in execution of a job.

14. a method for operating user interfaces of a multi-user peripheral device configured for performing print jobs, scan jobs and copy jobs, the device capable of operating in multiple different simultaneous job contexts and having a device controller and a native user interface (UI), the device controllable from a plurality of access points, the method comprising:

operating the device to perform multiple simultaneous different jobs;

associating an instance of the native UI with each one of said job contexts, said multiple simultaneous job contexts including at least one of a print job context, a copy job context and a scan job context;

creating a virtual UI corresponding to said instance of the native UI for one of said access points, the virtual UI maintained in a device-independent format;

converting the virtual UI into a physical UI instance for one of said access points;

rendering the physical UI at said one of the access points;

switching job contexts to handle simultaneously a plurality of job contexts;

wherein a plurality of virtual UIs are associated with said plurality of job contexts; and     wherein a change in a virtual UI state for one job context effects a change in a virtual UI state for another of said plurality of job contexts; and     wherein said operating the device in multiple simultaneous job contexts includes:

job context switching between job contexts using time-sharing, the device controller time slicing operations between job contexts to avoid resource conflicts;

storing information for each job context by the device controller, including information to suspend and resume the job context, including a current UI state as a UI context state associated with the job.

15. The method of claim 14, wherein said device-independent format is one of a HTML, an XHTML/CSS, a WML or an XML schema.

16. The method of claim 14, wherein said plurality of access points includes a front panel interface and a remote access point.

17. The method of claim 16, wherein said remote access point includes a remote application interface or a web interface.

* * * * *